United States Patent [19]

Jackson, Jr. et al.

[11] Patent Number: 4,830,846

[45] Date of Patent: May 16, 1989

[54] SEPARATION PROCESS FOR ANHYDROUS HCL AND HBR BY THERMAL CLEAVAGE

[75] Inventors: Herbert C. Jackson, Jr.; Robert A. DeVries; Hughie R. Frick, all of Midland, Mich.

[73] Assignee: The Dow Chemical Company, Midland, Mich.

[21] Appl. No.: 150,184

[22] Filed: Jan. 29, 1988

[51] Int. Cl.$^4$ ............................ C01B 7/07; C01B 7/01
[52] U.S. Cl. ...................................... 423/488; 423/481
[58] Field of Search ................................ 423/481, 488

[56] References Cited

U.S. PATENT DOCUMENTS

| | | | |
|---|---|---|---|
| 4,230,681 | 10/1980 | Coenen et al. | 423/488 |
| 4,254,092 | 3/1981 | Coenen et al. | 423/488 |
| 4,640,831 | 2/1987 | DeVries | 423/488 |

FOREIGN PATENT DOCUMENTS

| | | | |
|---|---|---|---|
| 792927 | 4/1958 | United Kingdom | 423/488 |
| 2030554 | 4/1980 | United Kingdom | 423/488 |

OTHER PUBLICATIONS

Chemical Abstract 93:28693x.

*Primary Examiner*—John Doll
*Assistant Examiner*—Lori S. Freeman
*Attorney, Agent, or Firm*—Barbara J. Sutherland

[57] ABSTRACT

A method for the separation of anhydrous HCl and HBr from mixtures of the two acids comprising treating the mixture with a hindered pyridine to form a mixture of hindered pyridine salts of the acids, and heating the mixture of salts to a temperature at which thermal cleavage of at least the hydrochloride salt is induced. The hindered pyridines are defined as aromatic compounds having one or more nitrogen atoms in an aromatic ring, or a polymer with pendant aromatic moieties having one or more nitrogens in an aromatic ring, having an appropriate degree of steric hindrance such that the salt formed by the nitrogen atom of the aromatic compound and a strong protic base will undergo dissociation to the aromatic compound and the protic acid at a temperature below the decomposition temperature of the aromatic compound. The formation of salts and their cleavage can be done as either a one-step or two-step process. The separation process is based on the fact that the HCl salts are less stable to heat than the HBr salts, and thus will cleave at a faster rate at any given temperature. It is possible to carry out the thermal cleavage at a temperature sufficient to induce cleavage of only the HCl salts, of both simultaneously, or at two separate sequential temperatures, to cleave only the HCl salts first and then the remaining HBr salts.

27 Claims, No Drawings

SEPARATION PROCESS FOR ANHYDROUS HCL AND HBR BY THERMAL CLEAVAGE

FIELD OF THE INVENTION

The present invention relates to the field of separation processes. More particularly, the invention relates to a method for the recovery of acids from their salts.

BACKGROUND OF THE INVENTION

There are many processes wherein protic acids are generated. In most of these processes it is desirable to recover the protic acids. In certain processes the protic acid is part of a waste stream and failure to recover the acid from the waste stream results in environmental damage. In other processes, the acid is a valuable product which can be used for further chemical processing, or can be recycled in the process. Thus, there is a need to recover such protic acids from waste streams or from reaction media.

A number of methods have been developed to recover such protic acids. One common method is to contact the acid with a basic compound such as an alkaline earth metal base, an alkali metal base, or an amine to form a salt. See, e.g., Morrison and Boyd, *Organic Chemistry*, 3rd ed. (1975) 731. There are several problems with this kind of process. First, in some of these processes, it is very hard to effect complete recovery of the acid from the system, since the salt formed may be hard to recover, or there may be acid that does not react with the base. When alkali metal or alkaline earth metal bases are used, the halogen value cannot be recovered in usable form. When an amine is used to recover the acid the amine may decompose when one tries to recover the acid from the base. In such cases it has been found that the dissociation conditions are harsher than the conditions at which the amine used to recover the acid undergoes decomposition. In either case, the acid is lost where the salt is lost, or the amine undergoes decomposition, either before the acid can be recovered or before the amine can be recycled.

Another method of recovering acids and organic bases from their mixtures is disclosed in U.S. Pat. No. 3,651,166. That patent discloses the use of organic bases, such as pyridine, the N-alkyl pyrrolidones, acetamide and dimethylformamide, to form organic baseacid salts or complexes, then dissociating these salts at a temperature lower than that at which decomposition of either, or both, the acid or the organic material takes place. In the case of pyridine, recovery of the pyridine is only possible when the salts are formed with weak organic acids, such as benzoic, naphthoic, and the like, and not with strong protic acids. An example of a typical process employing an organic base wherein the base is converted to an acid salt is described in U.S. Pat. No. 3,360,583. That process relates to the production of polyolefinic materials by reacting a haloether with an olefin to form a haloether adduct of the olefin and splitting alcohol hydrogen halide from the intermediate adduct in the presence of an organic base to form a conjugated polyolefin and the hydrogen halide salt of the organic base. More specifically, chloromethyl methyl ether is reacted with isobutylene to form an intermediate adduct. The adduct is then heated in the presence of N-methyl-2-pyrrolidone to convert the adduct to isoprene. The N-methyl-2-pyrrolidone is simultaneously converted to its hydrogen halide salt. Thus, these two patents take together provide a process for formation of salts and their dissociation. However, one problem is encountered. The pyrrolidone will not combine with strong protic acids to form salts. Thus, the process of U.S. Pat. No. 3,651,166 cannot be used to recover these protic acids.

Even where recovery of protic acids can be accomplished using any of the known methods, these methods of recovery do not distinguish between differing acids present in one stream. In many instances it is necessary to deal with mixtures of protic acids, rather than pure acids, because a number of chemical processes result in, or produce as byproduct, a mixture of HCl and HBr. For example, a mixture of these acids can be produced in the manufacture of HCl. See, e.g., Kirk-Othmer, *Encyclopedia of Chemical Technology*, 2nd ed., vol. 11 (1967) 307–337, particularly 314–323.

It is often desirable in the art to separate HCl and HBr to allow recovery of either or both as pure compounds. A commonly used method of separation involves selective absorption of the given gas. For example, U.S. Pat. No. 3,488,923 shows the solvent extraction of hydrogen halides. The mixture of hydrogen chloride and hydrogen bromide is contacted with a solvent system comprising a phenolic compound and a polyether with or without zinc chloride or zinc bromide. U.S. Pat. No. 4,036,939 shows a method of recovering hydrogen chloride from an organic solvent loaded with HCl in a dilute aqueous solution by carrying out, prior to distillation, a dehydration of the loaded organic solvent in a dehydration extractor in which the solvent is circulated countercurrent to an aqueous solution having a high chloride solution.

Finally, U.S. Pat. No. 4,254,092 discloses a method of separating HCl from a mixture of HBr and HCl using the difference in the stability to heat of the amine hydrohalides thereof. A mixture of HBr/HCl is treated with a solution of a tertiary amine and the HCl is split off, by the action of heat, from the amine hydrochlorides in the resulting mixture of amine hydrochlorides and amine hydrobromides. The HBr is recovered from the residual amine hydrobromides with the aid of a base. Suitable bases are, for example, sodium hydroxide, potassium hydroxide, calcium hydroxide, barium hydroxide, sodium carbonate, and potassium carbonate. This process has two drawbacks, however. First, not all of the original amine is regenerated when the amine HCl salt is cleaved to recover the HCl. Thus, it is impossible to separate all of the HCl and recycle the amine. Second, this amine decomposition contaminates the final product.

Further information as to the physical properties and methods of preparation of hydrogen bromide and sodium bromide, prepared by the neutralization of sodium carbonate or hydroxide with hydrobromic acid, are disclosed in Kirk-Othmer, *Encyclopedia of Chemical Technology*, 2nd ed., vol. 3 (1964) 767–768 and vol. 18 (1969) 484–485.

Thus, what is needed is a method of separating HCl and HBr from mixtures thereof, that does not suffer the drawbacks of the prior art and is economical and efficient.

SUMMARY OF THE INVENTION

The present invention provides a method for separating a mixture of hydrogen chloride and hydrogen bromide comprising (a) treating a mixture comprising hydrogen chloride and hydrogen bromide with a hindered pyridine to form a mixture of hindered pyridine hydrochlorides and hindered pyridine hydrobromides; (b) heating the mixture of hindered pyridine hydrochlorides and hindered pyridine hydrobromides to a temperature at which the hindered pyridine hydrochlorides cleave to form hydrogen chloride at a rate faster than the rate at which the hindered pyridine hydrobromides cleave to form hydrogen bromide.

This method allows for separation of the hydrogen chloride from hydrogen bromide as a function in the difference in the stability to heat of hindered pyridine hydrobromides when compared with that of hindered pyridine hydrochlorides.

DESCRIPTION OF THE PREFERRED EMBODIMENTS

In brief, the present invention provides a convenient, economical method of producing a separation of HCl and HBr by, first, producing a mixture of salts of these strong protic acids, followed by the heat-stimulated cleavage of the salts to form the given acids. Because the salts have different temperatures at which they cleave, a separation can be effected thereby. In general, HCl salts thermally dissociate faster then HBr salts.

The vehicle used to produce the salt is a hindered pyridine. This hindered pyridine serves as a weak base to combine with the acids to form the hindered pyridine salts. In the processes of the present invention the term "reversible base" can be used interchangeably to denote these hindered pyridines, which are generally described as aromatic compounds having one or more nitrogen atoms in an aromatic ring, or a polymer with pendant aromatic moieties having one or more nitrogens in an aromatic ring, wherein the nitrogen atom is sterically hindered in a manner such that the salt formed by the nitrogen atom of the aromatic compound and a strong protic base will undergo dissociation to the aromatic compound and the protic acid at a temperature below the decomposition temperature of the aromatic compound. Preferred hindered pyridines are compounds which correspond to one of the following formulas

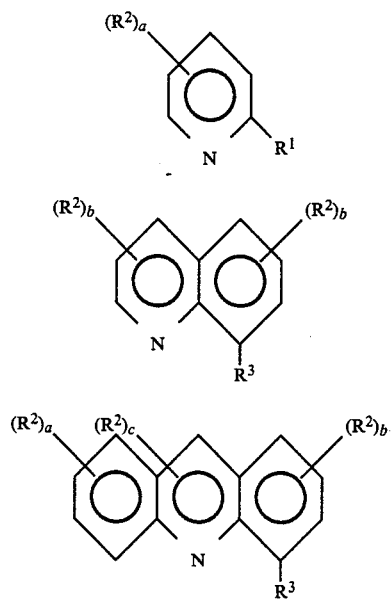

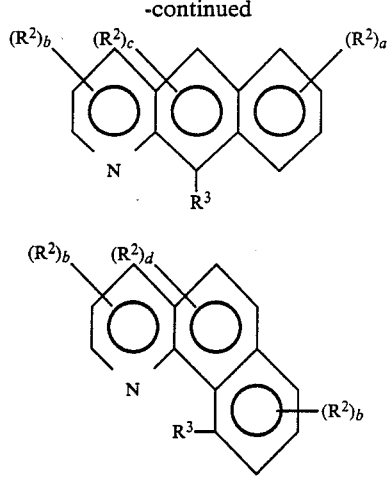

or is a polymer containing units corresponding to one of the following formulas

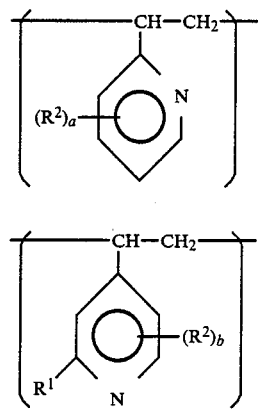

wherein $R^1$ is separately in each occurence $C_{2-20}$ alkyl, $C_{6-20}$ aryl, $C_{7-20}$ alkaryl, $C_{7-20}$ aralkyl or $C_{3-20}$ cycloalkyl, wherein the $C_{2-20}$ alkyl, $C_{6-20}$ aryl, $C_{7-20}$ aralkyl, $C_{7-20}$ alkaryl or $C_{3-20}$ cycloalkyl is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; $R^2$ and $R^3$ are separately in each occurrence $C_{1-20}$ alkyl, $C_{6-20}$ aryl, $C_{7-20}$ alkaryl, $C_{7-20}$ aralkyl, $C_{3-20}$ cycloakyl, nitro, cyano, halo, $C_{1-20}$ alkoxy, $C_{6-20}$ aryloxy, $C_{7-20}$ alkaryloxy or $C_{7-20}$ aralkoxy wherein the $C_{1-20}$ alkyl, $C_{6-20}$ aryl, $C_{7-20}$ alkaryl, $C_{7-20}$ aralkyl, $C_{1-20}$ alkoxy, $C_{6-20}$ aryloxy, $C_{7-20}$ alkaryloxy, $C_{7-20}$ aralkoxy or $C_{3-20}$ cycloalkyl group is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; a is separately in each occurrence an integer of from 0 to 4; b is separately in each occurrence an integer of from 0 to 3; c is separately in each occurrence the integer 0 or 1; and d is separately in each occurrence an integer of from 0 to 2. Mixtures of the above compounds or polymers comprising mixtures of the given moieties are also preferred.

In the hereinbefore presented formulas $R^1$ is preferably $C_{3-10}$ alkyl, $C_{6-10}$ aryl, $C_{7-10}$ alkaryl, $C_{7-10}$ aralkyl, $C_{5-10}$ cycloalkyl, $C_{6-10}$ aryloxy and $C_{7-10}$ alkaryloxy. More preferably $R^1$ is $C_{3-10}$ alkyl, $C_{7-10}$ alkaryloxy, $C_{6-10}$ aryloxy or $C_{6-10}$ aryl; $R^1$ is most preferably isopropyl, isobutyl, t-butyl, phenoxy, or phenyl. $R^2$ is preferably halo or $C_{1-10}$ alkyl. $R^2$ is more preferably $C_{1-3}$ alkyl. $R^3$ is preferably $C_{2-10}$ alkyl, $C_{6-10}$ aryl, $C_{6-10}$ aryloxy or $C_{7-10}$ alkaryloxy. $R^3$ is more preferably $C_{3-10}$ alkyl, phenoxy or phenyl. $R^3$ is most preferably isopropyl, isobutyl, t-butyl, phenoxy or phenyl. Preferably, a is an integer of from 0 to 2, and most preferably 0 or 1. Preferably, b is an integer of 0 or 1. Preferably, d is an integer of 0 or 1.

Examples of preferred hindered pyridines include 2,4,6-tri-t-butylpyridine, 2,6-di-t-butyl-4-methylpyridine, 2,6-di-t-butylpyridine, 2-t-butylpyridine, 2-benzylpyridine, 2,6-diphenylpyridine, 2-phenylpyridine, 2,6-dimethoxypyridine, 2-phenoxypyridine, 2,6-diphenoxypyridine, 2,6-dimethoxypyridine, 2-methylquinoline, 6-methylquinoline, 7,8-benzoquinoline, and mixtures thereof. More preferred hindered pyridines include 2,4,6-tri-t-butylpyridine, 2,6-di-t-butyl-4-methylpyridine, 2,6-di-t-butylpyridine, 2-t-butylpyridine, 2-benzylpyridine, 2,6-diphenylpyridine, 2-phenylpyridine, 2-phenoxypyridine, 2,6-diphenoxypyridine and 2,6-dimethoxypyridine, and mixtures thereof. In general the thermolysis rate increases as the degree of steric hindrance increases, such that the temperature at which cleavage can be induced is lowered. Also preferred are some polyvinyl pyridine resins, including homopolymers of vinyl pyridine compounds, which are appropriately sterically hindered as defined above, and copolymers of vinyl pyridine compounds, also hindered as defined, with 1,2-ethylenically unsaturated compounds, for example, styrene, divinylbenzene, ethylene, vinyl chloride, and the like. Furthermore, the vinyl pyridines can be polymerized with two or more of such 1,2-ethylenically unsaturated compounds. Such polymerization processes are well known in the art. See, e.g., D'Aelio, U.S. Pat. No. 2,623,013, and Kirk-Othmer, *Encyclopedia of Chemical Technology*, 3rd ed., vol. 21, 816 et seq. and vol. 19, 475–76, references incorporated herein by reference.

It is preferred that the hindered pyridine used for this invention have a purity of above about 90 percent, preferably above about 95 percent and most preferably above about 99 percent by weight. The boiling point of the hindered pyridines should be above, preferably by at least 20° C., the thermal dissociation temperature of both the hydrochloride and hydrobromide salts under dissociation conditions.

The medium from which the acid is recovered can be any medium in which the designated acids are present or in which the designated acids are generated. That medium can be a gaseous mixture which either contains the acids or in which the acids are generated.

Alternatively, the medium can be a liquid. In some embodiments the medium can be a reaction mixture in which the acids are generated by the reaction performed, wherein the recovery of or neutralization of the acids is desirable. Specific examples of mediums which are useful in this invention include waste streams from organic processes, gaseous reaction mixtures, liquid reaction mixtures, gases in a smoke stack, and the like. The mixture can comprise a hydrogen bromide concentration of from about 0.001 to about 99.999 percent by weight, and a similar range of hydrogen chloride concentration.

In general, the acid-containing medium is contacted with the hindered pyridine base under conditions such that salts of the acids and base are formed. In particular, an acid-containing gas mixture or liquid mixture can be treated with the given reversible base, which can be either a liquid, dissolved in a liquid solvent, slurried in a liquid, or can be a solid.

In those embodiments wherein the acid mixture is in a gaseous medium, the gaseous medium can be passed over a bed of the hindered pyridine in solid form; it can be bubbled through the pure hindered pyridine, or a solution of the hindered pyridine; or the gaseous medium containing the acids can be passed through a column countercurrently with the liquid hindered pyridine, or a solution containing the liquid pyridine. In one preferred embodiment, the contacting is conducted by feeding the gaseous medium into a column while the hindered pyridine-containing liquid is fed into the top of the column, wherein the hindered pyridine liquid flows downward through the column, contacting the gaseous mixture flowing upward through the column. The gaseous medium freed from the acids emerges from the top. The liquid containing the hindered pyridine base and the salt of the base is collected at the bottom of the column.

In those embodiments wherein the acid mixture is in a liquid medium, such medium can be a waste stream containing the acids or a reaction mixture which generates the acids. This liquid medium containing the acids can be passed over a bed of a solid containing the hindered pyridine. Alternatively, the liquid medium can be passed countercurrently through a tube with the hindered pyridine either in pure liquid form or dissolved in a solvent. In those embodiments wherein the acids are generated in a reaction medium, the hindered pyridine can either be slurried into or dissolved into the liquid reaction medium.

In general, the protic acids and the hindered pyridine can be contacted at any temperature at which the salts of the acids and the hindered pyridine are formed. Preferable temperatures for such contacting are from about −50° C. to about 300° C., and more preferable temperatures are from about −50° C. to about 150° C. More preferable temperatures for this contacting are from about 0° C. to about 100° C.

The stoichiometric ratio of the hindered pyridine to the acids is not critical to the invention but will affect the rate of salt formation and dissociation. In general, an excess of the hindered pyridine is preferred for more complete removal of the acids from the medium. The salts of the acids are in equilibrium with the dissociated acids and the hindered pyridine at all times, and under lower temperatures the equilibrium is shifted towards the formation of the salts. In general, the ratio of hindered pyridine base to acids can be preferably from about 1:10 to about 10:1. Solvents useful for dissolving the hindered pyridine bases are inert solvents which can be polar or non-polar. Preferred solvents are inert, polar, and have boiling points above or at the desired thermal dissociation temperature. Concentrations can preferably range from about 0.5 to about 99.5 percent by weight, and more preferably from about 0.5 to about 25 percent by weight. Preferable solvents include organic liquids which, under the process conditions, are liquid and inert. Such solvents include aliphatic, aromatic, and cycloaliphatic hydrocarbons. These hydrocarbons can be substituted with halogen-, ether-, amide-, or ketone-containing moieties. Preferred solvents include tetralin, dodecane, tetradecane, xylenes, o-dichlorobenzenes, diphenylene oxide, and mixtures thereof.

In addition to the contact or treatment step it is necessary to thermally cleave the hindered pyridine-based salts formed in that treatment step. This thermal cleavage encompasses heating the salts at a temperature sufficient to induce cleavage, and preferably one that is not sufficient to decompose the hindered pyridine recovered as a result of the cleavage. Preferably the cleavage is carried out at a temperature from about 50° C. to about 300° C., more preferably about 50° C. to about 250° C. The thermolysis rate in general increases with temperature, approximately doubling for every 15° C. temperature rise. Thus, over the given temperature range the cleavage rates can be varied from very fast to very slow. It is preferred to use a temperature at which at least about 90 percent by weight of the hydrogen chloride is separated in the gaseous state, while leaving at least about 90 percent by weight of the hydrogen bromide as uncleaved hindered pyridine hydrobromides.

Thus, the two parts of the process—the contacting with the hindered pyridine to form the salts, and the selective thermal cleavage, i.e., dissociation of the hydrochloride salts at a rate faster than dissociation of the hydrobromide salts, owing to the difference in stability to heat—can be carried out as either a one-step or a two-step process. It is possible to have both the hindered pyridine and the acid mixture at the desired cleavage temperature prior to salt formation, such that the hydrogen chloride salt is cleaved immediately upon formation, but the hydrogen bromide salt is not. It is also possible to carry out the treatment with the hindered pyridine at a temperature sufficient to form salts but not sufficient to induce cleavage, followed by heating to a temperature sufficient to induce cleavage of the hydrogen chloride salt at a rate faster than the cleavage of the hydrogen bromide salt.

It is preferred that the reaction sequence be carried out under an inert atmosphere, such as any inert gas flow including nitrogen, argon, helium, or other inert gases, or, alternatively, a vacuum can be used. Thus, the use of a sparge gas or vacuum will help to prevent competing reactions. This contacting and salt production can be performed at any pressure at which the salts form, and preferably from about 0.013 atmosphere to about 140 atmospheres, more preferably from about 1 atmosphere to about 10 atmospheres.

The thermal cleavage in one embodiment can be carried out under conditions in which the salts are dissolved in a suitable solvent and heated to the reflux temperature of the solvent, or to a temperature at least above the dissociation temperature of the hydrogen chloride salt desirably to be separated. Examples of preferred solvents, preferably refluxing at least about 20° C. above the dissociation temperature, include those suitable for preparing the hindered pyridine salts, since it is preferable for reasons of convenience to use a single solvent throughout the reaction sequence. These are preferably tetralin, dodecance, tetradecane, xylenes, o-dichlorobenzenes, diphenylene oxide, and mixtures thereof. Again, preferred solvents are inert to the acids and polar. Because in general the hydrogen bromide salt dissociates at a higher temperature than the hydrogen chloride salt, it is preferred to do a stepwise process as described above, using a solvent having a reflux temperature between the dissociation temperatures of the two salts to effect the hydrogen chloride cleavage, then increasing the heat to effect dissociation of the hydrogen bromide if desired. It is further preferable that this increased heating be done at a temperature that is below the decomposition temperature of the hindered pyridine. This will allow recycling of the hindered pyridine that remains after all hydrogen bromide has been removed, and therefore potentially substantial cost savings. In another embodiment, the salts can be exposed as solids to the appropriate temperatures for the dissociations.

Alternatively, it is possible to cleave the remaining hydrogen bromide from the hindered pyridine hydrobromides by treatment with a strong base. For example, strong bases can be selected from the group consisting of sodium hydroxide, potassium hydroxide, calcium hydroxide, barium hydroxide, sodium carbonate, potassium carbonate, calcium oxide and mixtures thereof. The method and conditions for this treatment would be known to those skilled in the art.

The following examples are included for illustrative purposes and do not limit the scope of the invention or the claims. Unless otherwise stated, all parts and percentages are by weight.

EXAMPLE 1

Preparation of acid salts: Separate HCl and HBr salts of 2-phenylpyridine (2-PP) are prepared by dissolving about 163 g of the 2-PP in 437 g of hexane in each of two 1-liter round bottom flasks. The solutions are cooled and maintained at about 5° C. to about 15° C. Excess anhydrous HCl is added to one solution through a dip-pipe, and excess anhydrous HBr is added to the other solution. The acid salts precipitate out of solution. These salts are separately recovered by suction filtration followed by drying in a vacuum oven at 25° C. to 45° C. overnight. The concentration of HCl or HBr in each salt is determined by titration of the salt with caustic in a water solution. Nearly quantitative yields of 2-PP-HCl and 2-PP-HBr salts are attained.

Thermal cleavage of individual acid salts: In order to determine the thermolysis rates of the individual salts at various temperatures, for comparative purposes, about 1.5 g of the 2-PP-HCl salt is placed in each of three 100-ml round bottom flasks, i.e., a total of about 4.5 g, and the same 1.5 g amounts of the 2-PP-HBr salt are placed in an additional three flasks. About 45 g of diphenylene oxide is added to each flask as a solvent. The six solutions are stirred with magnetic stirrers. Prepurified, dry nitrogen (99.9999 percent) is supplied to the flasks at a sweep or sparge rate of at least about 20 cc/min.

Separae oil baths are brought to and maintained at three temperatures—125° C., 175° C., and 225° C. The flasks containing the salts are submerged in the oil baths, such that there is a 2-PP-HCl solution and a separate 2-PP-HBr solution being subjected to each different temperature. The sweep gases containing HCl or HBr are neutralized by passing through 0.1N NaOH solutions in individual 1000 ml flasks. Anhydrous HCl and HBr generation is detected, and the rates monitored by measuring the change in the millivolt signal caused by NaCl and NaBr formation. The millivolt signals are monitored with chloride or bromide ion specific electrodes, according to the salt constituent, a dual junction reference electrode, and a digital pH/millivolt meter.

Table 1 shows the thermolysis rates, percent acid recovered, and half-life for each individual acid salt at the three different temperatures. The percent acid recovered is based on 100 percent of the total acid present in the salt, regardless of its percent concentration in the salt. The thermolysis half-life indicates the time for half of the total specified acid salt to be thermally cleaved to form the acid.

TABLE 1

| Oil Bath | Temp. (°C.) | Acid Salt | Time (hrs.) | Percent Acid Recovered | Rate (hr$^{-1}$) | Half-life (min.) |
|---|---|---|---|---|---|---|
| 1 | 225 | HCl | 0.58 | 95.7 | 4.851 | 8.6 |
|   |     | HBr | 6.0  | 14.0 | 0.0275 | 1,514 |
| 2 | 175 | HCl | 2.25 | 57.8 | 0.41 | 101.5 |
|   |     | HBr | 4.0  | 0.38 | 0.00089 | 46,639 |
| 3 | 125 | HCl | 5.0  | 9.65 | 0.0246 | 1,690 |
|   |     | HBr | 5.0  | <0.05 | * | * |

*denotes not calculated.

Thermal cleavage of combined acid salts: In order to determine whether the thermolysis recovery rates of the individual acid salts are significantly altered when they are combined in one stream, about 1.5 g each of the 2-PP-HCl salt and the 2-PP-HBr salt, prepared as shown above, are dissolved in about 45 g of diphenylene oxide in one flask using the same addition and stirring method. Thermal cleavage is carried out as described above using oil bath 3, at 125° C. for 5.0 hours. The rates of anhydrous HCl and HBr generation are measured under the same conditions, using both chloride and bromide ion specific electrodes. An HCl formation rate approximating that shown in Table 1 is measured. No HBr formation is detected.

EXAMPLE 2

A stream containing 1000 lbs of protic acids at concentrations of 50 percent HCl and 50 percent HBr can be separated to the respective protic acids by the use of one embodiment of the present invention under the following conditions to yield the separation of anyhydrous HCl and HBr:

Formation of 2-Phenylpyridine (2-PP) Salts

In the above-described stream there are estimated to be 500 lbs of HCl and 500 lbs of HBr 2-PP weighs 155.2 lbs/mole; HCl weighs 36.45 lbs/mole; and HBr weighs 80.9 lbs/mole. Thus, 2,129 lbs of 2-PP are required to form a salt with the HCl, and 959 lbs of 2-PP are required to form a salt with the HBr. Thus a total of 3,088 lbs of 2-PP is required to be added to form salts of the two protic acids.

Thermal Cleavage of Salts

The 2-PP reaction with HCl and HBr produces 2,629 lbs of 2-PP HCl salt and 1,459 lbs of 2-PP HBr salt, respectively. The kinetic rate for thermal cleavage of the salts at 225° C. shows that for HCl it is 4.851 hr$^{-1}$, and for HBr it is 0.0275 hr$^{-1}$, as calculated in Table 1 for Example 1. Thus, after 0.6 hours, the recovered HCl is 472.8 lbs or 94.6 percent of charge, leaving 27.2 lbs or 5.4 percent of charge of HCl remaining in the salt. For HBr, the recovery is 8.2 lbs or 1.6 percent of charge, leaving 491.8 lbs or 98.4 percent of charge of HBr salt remaining.

Thus, the anhydrous protic acid stream at the 0.6 hour time contains a total of 481 lbs of protic acid. The concenration of the stream is 98.3 weight percent HCl and 1.7 weight percent HBr, respectively. The concentration of HBr recovery can be further reduced by lowering the temperature of the thermal cleavage.

What is claimed is:

1. A method of separating a mixture of hydrogen chloride and hydrogen bromide comprising:
    (a) treating a mixture comprising hydrogen chloride and hydrogen bromide with a hindered pyridine to form a mixture of hindered pyridine hydrochlorides and hindered pyridine hydrobromides;
    (b) heating the mixture of hindered pyridine hydrochlorides and hindered pyridine hydrobromides to a temperature at which the hindered pyridine hydrochlorides cleave to form hydrogen chloride at a rate faster than the rate at which the hindered pyridine hydrobromides cleave to form hydrogen bromide.

2. The method of claim 1 wherein the treating and heating are carried out in sequential steps.

3. The method of claim 1 wherein the treating and heating are carried out concurrently.

4. The method of claim 1 wherein the hindered pyridine is selected from the group consisting of compounds which correspond to one of the following formulas:

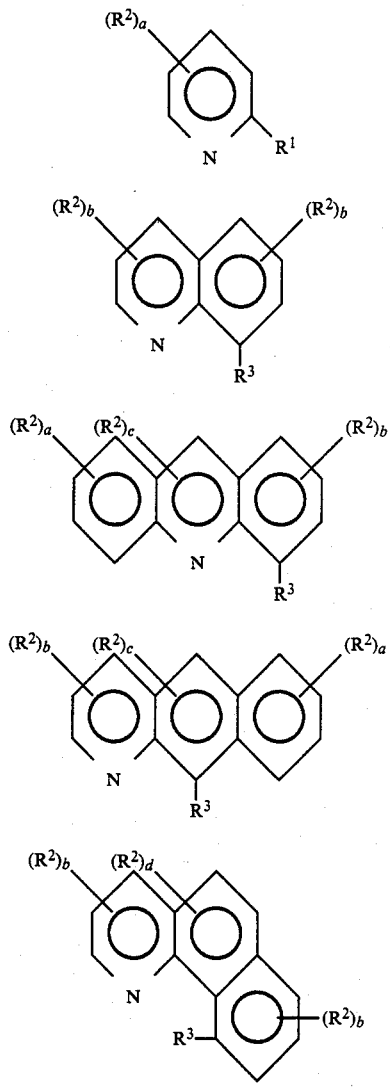

wherein $R^1$ is separately in each occurence $C_{2-20}$ alkyl, $C_{6-20}$ aryl, $C_{7-20}$ alkaryl, $C_{7-20}$ aralkyl or $C_{3-20}$ cycloalkyl, wherein the $C_{2-20}$ alkyl, $C_{6-20}$ aryl, $C_{7-20}$ aralkyl, $C_{7-20}$ alkaryl or $C_{3-20}$ cycloalkyl is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; $R^2$ and $R^3$ are separately in each occurrence $C_{1-20}$ alkyl, $C_{6-20}$ aryl, $C_{7-20}$ alkaryl, $C_{7-20}$ aralkyl, $C_{3-20}$ cycloakyl, nitro, cyano, halo, $C_{1-20}$ alkoxy, $C_{6-20}$ aryloxy, $C_{7-20}$ alkaryloxy or $C_{7-20}$ aralkoxy wherein the $C_{1-20}$ alkyl, $C_{6-20}$ aryl, $C_{7-20}$ alkaryl, $C_{7-20}$ aralkyl, $C_{1-20}$ alkoxy, $C_{6-20}$ aryloxy, $C_{7-20}$ alkaryloxy, $C_{7-20}$ aralkoxy or $C_{3-20}$ cycloalkyl group is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; a is separately in each occurrence an integer of from 0 to 4; b is separately in each occurrence an integer of from 0 to 3; c is separately in each occurrence the integer 0 or 1; and d is separately in each occurrence an integer of from 0 to 2; and mixtures thereof.

5. The method of claim 1 wherein the hindered pyridine is selected from the group consisting of polymers containing units corresponding to one of the following formulas:

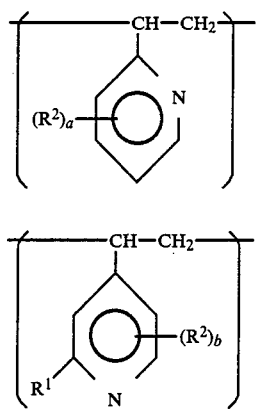

wherein $R^1$ is separately in each occurence $C_{2-20}$ alkyl, $C_{6-20}$ aryl, $C_{7-20}$ alkaryl, $C_{7-20}$ aralkyl or $C_{3-20}$ cycloalkyl, wherein the $C_{2-20}$ alkyl, $C_{6-20}$ aryl, $C_{7-20}$ aralkyl, $C_{7-20}$ alkaryl or $C_{3-20}$ cycloalkyl is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; $R^2$ and $R^3$ are separately in each occurrence $C_{1-20}$ alkyl, $C_{6-20}$ aryl, $C_{7-20}$ alkaryl, $C_{7-20}$ aralkyl, $C_{3-20}$ cycloakyl, nitro, cyano, halo, $C_{1-20}$ alkoxy, $C_{6-20}$ aryloxy, $C_{7-20}$ alkaryloxy or $C_{7-20}$ aralkyloxy wherein the $C_{1-20}$ alkyl, $C_{6-20}$ aryl, $C_{7-20}$ alkaryl, $C_{7-20}$ aralkyl, $C_{1-20}$ alkoxy, $C_{6-20}$ aryloxy, $C_{7-20}$ alkaryloxy, $C_{7-20}$ aralkoxy or $C_{3-20}$ cycloalkyl group is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; a is separately in each occurrence an integer of from 0 to 4; b is separately in each occurrence an integer of from 0 to 3; c is separately in each occurrence the integer 0 or 1; and d is separately in each occurrence an integer of from 0 to 2; and mixtures thereof.

6. The method of claim 1 wherein the hindered pyridine is selected from the group consisting of 2,4,6-tri-t-butylpyridine, 2,6-di-t-butyl-4-methylpyridine, 2,6-di-t-butylpyridine, 2-t-butylpyridine, 2-benzylpyridine, 2,6-diphenylpyridine, 2-phenylpyridine, 2,6-dimethoxypyridine, 2-phenoxypyridine, 2,6-diphenoxypyridine, 2,6-dimethoxypyridine, 2-methylquinoline, 6-methylquinoline, 7,8benzoquinoline, and mixtures thereof.

7. The method of claim 1 wherein the hindered pyridine is a polymer selected from the group consisting of homopolymers of hindered vinyl pyridine compounds, copolymers of hindered vinyl pyridine compounds and 1,2-ethylenically unsaturated compounds, and mixtures thereof.

8. The method of claim 7 wherein the 1,2-ethylenically unsaturated compounds are selected from the group consisting of styrene, divinylbenzene, ethylene, vinylchloride, and mixtures thereof.

9. The method of claim 1 wherein a solvent inert to HCl and HBr is used to dissolve the hindered pyridine.

10. The method of claim 1 wherein the solvent is selected from the group consisting of tetralin, dodecane, tetradecane, xylenes, o-di-chlorobenzenes, diphenylene oxide, and mixtures thereof.

11. The method of claim 1 wherein a solvent inert to HCl and HBr is used to dissolve the hindered pyridine hydrochlorides and hindered pyridine hydrobromides.

12. The method of claim 11 wherein the solvent boils at a temperature above that at which the hindered pyridine hydrochlorides cleave to form hydrogen chloride.

13. The method of claim 12 wherein the solvent is selected from the group consisting of tetralin, dodecane, tetradecane, xylenes, o-di-chlorobenzenes, diphenylene oxide, and mixtures thereof.

14. The method of claim 1 wherein the heating is done at a temperature from about 50° C. to about 300° C.

15. The method of claim 1 wherein the separation is carried out under an inert atmosphere.

16. The method of claim 15 wherein the inert atmosphere is selected from the group consisting of argon, nitrogen, helium, and mixtures thereof.

17. The method of claim 1 wherein the separation is carried out under vacuum.

18. The method of claim 1 wherein at least about 90 percent of the hydrogen chloride is separated in the gaseous state while leaving at least about 90 percent of the hindered pyridine hydrobromides.

19. The method of claim 1 comprising a further step wherein the hindered pyridine hydrobromides are cleaved by heating to a temperature to recover hydrogen bromide.

20. The method of claim 1 comprising a further step wherein the hindered pyridine hydrobromides are cleaved by treating with a strong base selected from the group consisting of sodium hydroxide, potassium hydroxide, calcium hydroxide, barium hydroxide, sodium carbonate, potassium carbonate, calcium oxide, and mixtures thereof.

21. The method of claim 1 wherein the hindered pyridine is recycled.

22. The method of claim 1 wherein the cleavage rate of the hindered pyridine hydrochlorides is at least about two times faster than the cleavage rate of the hindered pyridine hydrobromides.

23. The method of claim 1 wherein the cleavage rate of the hindered pyridine hydrochlorides is at least about ten times faster than the cleavage rate of the hindered pyridine hydrobromides.

24. The method of claim 1 wherein the mixture comprising hydrogen chloride and hydrogen bromide comprises from about 0.001 to about 99.999 percent by weight hydrogen bromide.

25. The method of claim 1 wherein the mixture comprising hydrogen chloride and hydrogen bromide comprises from about 0.001 to about 99.999 percent by weight hydrogen chloride.

26. The method of claim 1 wherein the hindered pyridine is introduced in a solution at a concentration of from about 0.5 to about 99.5 percent by weight.

27. The method of claim 1 wherein the hindered pyridine is introduced in a solution at a concentration of from about 0.5 to about 25 percent by weight.

* * * * *

UNITED STATES PATENT AND TRADEMARK OFFICE
CERTIFICATE OF CORRECTION

PATENT NO. : 4,830,846

DATED : May 16, 1989

INVENTOR(S) : Herbert C. Jackson, Jr.; Robert A. DeVries and Hughie R. Frick

It is certified that error appears in the above-identified patent and that said Letters Patent is hereby corrected as shown below:

On the title page, Inventors: shown as "Herbert C. Jackson, Jr.,; Robert A. DeVries; Hughie R. Frick, all of Midland, Mich." should correctly appear as -- Robert A. DeVries; Hughie R. Frick; Herbert C. Jackson, Jr., all of Midland, Mich. --.

Cover Sheet, Title please delete "SEPARATION PROCESS FOR ANHYDROUS HCL AND HBR BY THERMAL CLEAVAGE" please insert -- SEPARATION PROCESS FOR ANHYDROUS HCl AND HBr BY THERMAL CLEAVAGE --.

Column 1, lines 1-2 change "HBR" to --HBr--.

Column 7, line 56 please delete "dodecance" and insert -- dodecane --.

Column 8, line 47, change "Separae" to --Separate--.

Column 9, line 60 please delete "concenration" and insert -- concentration --.

Column 11, line 42 please delete "cycloakyl" and insert -- cycloalkyl --.

UNITED STATES PATENT AND TRADEMARK OFFICE
CERTIFICATE OF CORRECTION

PATENT NO. : 4,830,846

DATED : May 16, 1989

INVENTOR(S) : Herbert C. Jackson, Jr., et al

It is certified that error appears in the above-identified patent and that said Letters Patent is hereby corrected as shown below:

Column 11, line 44 please delete "aralkyloxy" and insert -- aralkoxy --.

Column 11, line 62 please delete "7.8benzoquinoline" and insert -- 7,8-benzoquinoline --.

Signed and Sealed this

Second Day of July, 1991

Attest:

HARRY F. MANBECK, JR.

Attesting Officer

Commissioner of Patents and Trademarks